Jan. 6, 1925. Re. 15,975
J. O. JOHNSON
SNOWPLOW
Original Filed April 1, 1921
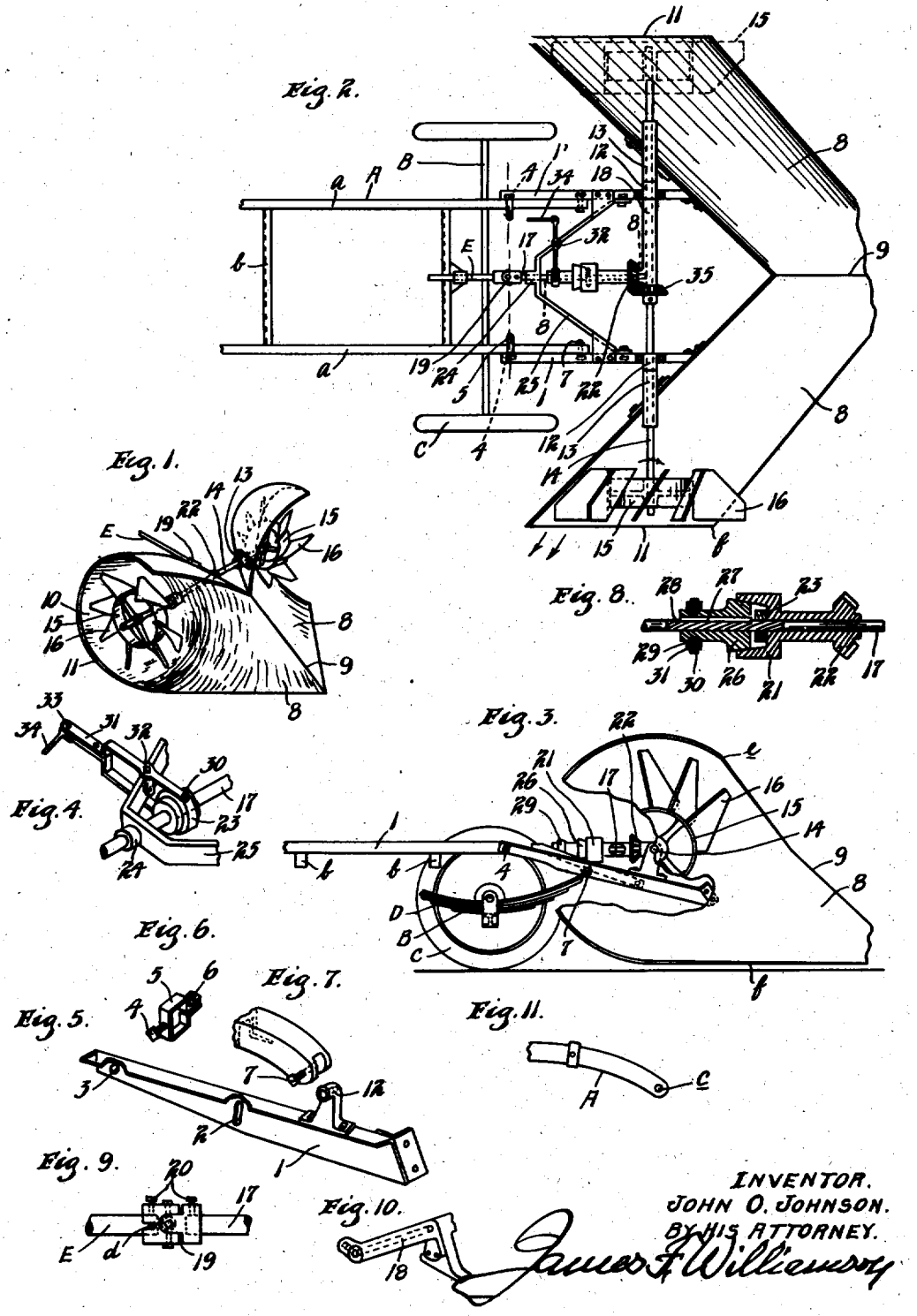
INVENTOR.
JOHN O. JOHNSON.
BY HIS ATTORNEY.
James F. Williamson Reissued Jan. 6, 1925.

Re. 15,975

UNITED STATES PATENT OFFICE.

JOHN O. JOHNSON, OF WHITE BEAR LAKE, MINNESOTA.

SNOWPLOW.

Original No. 1,419,263, dated June 13, 1922, Serial No. 457,690, filed April 1, 1921. Application for reissue filed June 9, 1924. Serial No. 719,020.

*To all whom it may concern:*

Be it known that I, JOHN O. JOHNSON, a citizen of the United States, residing at White Bear Lake, in the county of Ramsey and State of Minnesota, have invented certain new and useful Improvements in Snowplows; and I do hereby declare the following to be a full, clear, and exact description of the invention, such as will enable others skilled in the art to which it appertains to make and use the same.

This invention relates to snow plows, and more particularly to snow plowing devices adapted to be attached to the forward end of an automobile, an object of the invention, being the provision of snow plowing means having rotary fan wheels, said means being readily attachable to the chassis frame and coupled with the cranking shaft to be driven thereby.

A further object of the invention, is to provide an attachment of the class described, which may be controlled from the seat of the automobile and which will be adjustable, so that it may be held raised from the ground at various positions.

A still further object of the invention is to provide, as an attachment to an automobile or truck, a plow member for scooping up the snow and conveying it laterally to rotary expellers, the plow member being formed to constitute a guiding shield partly encircling the expellers.

To this end the invention consists in the construction, combination and arrangement of parts hereinafter described and claimed.

In the drawings forming part of this specification,

Figure 1 is a perspective view of my improved device, some of the connecting mechanism not being shown.

Figure 2 is a plan view of the forward part of an automobile chassis frame (shown semi-diagrammatically) having the invention attached thereto, the latter being shown partly in section to more clearly show the parts.

Figure 3 is a side view of same, partly broken away to bring some of the parts into full view.

Figure 4 is a perspective view of part of the clutch mechanism for the expeller elements.

Figure 5 is a perspective view of one of the side rails for supporting the mold boards.

Figure 6 is a perspective view of one of the clamps for securing the device to the automobile.

Figure 7 is a somewhat enlarged perspective view of one of the forward ends of the chassis frame side members.

Figure 8 is a longitudinal sectional view on the line 8—8 of Figure 2.

Figure 9 is a longitudinal sectional view of the universal coupling connecting the cranking stub shaft of the automobile with the drive shaft for the expelling wheels.

Figure 10 is a perspective view of a journal supporting arm secured to the frame; and Figure 11 is a side view of the forward end of one of the chassis frame side members showing the clamp positioned thereon.

A designates the chassis frame of an automobile or truck, comprising side member *a* and cross members *b*. B designates the front axle and C the front wheels, the steering knuckles not being shown. The chassis frame shown extends forward of the axle, and is curved downwardly and formed at its free end with an eye *c* axially parallel with the axle. The eye is pivotally connected by the usual pivot pin with the semi-elliptic spring D, which latter rests on the axle B. E designates the cranking end of the crank shaft, it being shown provided with the usual transverse cross pin *d* adapted to be engaged by the usual cranking handle, not shown.

The invention comprises a frame consisting of forwardly and downwardly extending angle iron side rails 1 and 1′, each having intermediate its ends, in its vertical leg, a slot 2 and at its rear end the bolt hole 3, the latter adapted to receive the threaded stud 4 of the clamping collar 5, the latter adapted to surround the side member *a* and be firmly clamped thereon by a bolt in the bolt hole 6. By removing the usual pivot pin in the eye *c* and substituting a bolt 7, which latter is adapted to extend through the slot 2, the side rail is rendered adjustable vertically, the stud 4 constituting a pivot. Secured to the forward ends of the side rails, are the centrally connected rearwardly inclined forwardly converging mold boards 8, extending laterally a distance beyond the wheels of the automobile. The forward surface of the mold boards is arcuate in form and is gradually extended circumferentially, as the boards recede from the median ridge 9, to form the semi-circular oppositely disposed laterally opening discharge funnels 10, the outer edges or rims 11 of the funnels being preferably in vertical parallel planes. The rim of the discharge funnels extends from the points *e* to *f* on the mold boards. Journaled in the journal boxes 12 on the side rails 1 and the journal boxes 13, supported in horizontal alignment on the mold boards 8, so as to be concentric with the circular rims 11 of the discharge funnels, is the fan wheel shaft 14, the latter rigidly carrying at its outer ends the expeller wheels 15, the latter being formed radial outwardly and rearwardly pitched triangular shaped blades 16, the peripheral inner corners of the blades being cut away to conform to the angle of divergence of the mold boards 8. As shown, the peripheral edges of the blades of the wheels are slightly spaced from the arcuate surfaces of the mold boards, so they may run freely to be rotated in the direction of travel. Snow forced laterally across the mold board will be caught up by the rotating wheels and expelled outwardly to the sides of the road. Extending inwardly from the side rail 1′, and rotatably supporting the forward end of the longitudinal disposed shaft 17, and loosely surrounding the shaft 14, is the bracket 18, the latter shown bolted to the base of the journal box 12. The shaft 17 extends to the cranking end of the crank shaft E, and is connected therewith by means of the universal coupling 19, by suitable set screws 20. Mounted rotatably on the shaft 17 is the female clutch member 21 preferably integral with the miter gear 22. A collar 23 secured to the shaft holds the clutch positioned longitudinally. Extending between the side rails 1 and 1′, is the cross brace 25, which latter carries the journal box 24, wherein is journaled the shaft 17. The cross brace and the side rails constitute a frame. Slidable on the shaft 17 is the male clutch member 26, adapted to frictionally engage with the female member 21, to drive the latter. The male member is fitted with a spline 27, slidable in the key seat 28, so as to rotate with shaft 17. Mounted rotatably in a groove on the male member is the shifting ring 29, the latter having oppositely disposed pivotal connections 30 with the shifting fork 31, said fork having fulcrum support 32 on the cross brace 25, and pivotal connection 33 at its face end with a pull rod 34. The pull rod extends rearwardly to a position (not shown) within reach of the driver, by operating the lever 34, the clutch members are operatively connected to rotate the miter gear 22. Rigid on the shaft 14 is the bevel gear 35, meshing with the miter gear, whereby the fan wheels are driven. It will be noted, that the mold board may be swung upward upon the studs 4, in the process of adjusting it by means of the bolt 7 in the slot 2 (Figs. 5 and 7).

By having a universal connection 19 with shaft E, the device may be swung bodily, inasmuch as the pivot bolts 4 (Figs. 6 and 3) are arranged in parallelism with the shaft 14 and in alignment with the pivot 36 of the universal joint (Fig. 2). In Fig. 11 the clamping member 5 is shown positioned on the chassis frame.

The term "automobile" used in the claims of this application is used in the broad sense and is meant to include any automobile, such as a truck, tractor, or other type.

What is claimed is:

1. A snow plow adapted to be mounted on a wheeled frame having a driving shaft mounted thereon, comprising opposite forwardly converging mold boards, said mold boards curved whereby to form opposite circular discharge funnels opening laterally, a transverse shaft concentric with said circular funnels mounted on said mold boards, a rearwardly and outwardly pitched fan wheel in the discharge opening of each funnel, a frame secured to the back of the mold boards, a connecting shaft rotatably mounted on said frame and having universal connection with said driving shaft, gear connections between said connecting shaft and transverse shaft whereby to rotate said fan wheels in the direction of travel when said driven shaft is actuated, means on said frame for adjustably attaching it to said wheeled frame, said means including opposite pivot supports approximately in lateral alignment with said universal connection.

2. The combination with a wheeled frame, said wheeled frame having a longitudinally disposed driving shaft extending forward of the front axle thereof, pivot support spaced horizontally one on either side of said driving shaft supported on said frame, and a clamping bolt one for each of said pivot supports supported on said frame at a point forward of said pivot supports; of a snow plow having a mold board, rotary means for expelling the snow which is scooped up by the mold board, and a longitudinally disposed shaft operatively connected with said snow expelling means to actuate the latter when said shaft is actuated, said plow being adapted to be pivoted on said pivot supports and to engage said clamping bolts to be clamped thereby, and having means whereby said shaft may be readily operatively connected to said driving shaft.

3. In a snow plow, the combination with a wheeled frame, said wheeled frame having a driving shaft mounted thereon; of a mold board having forwardly converging rearwardly inclined walls, said walls being curved to form opposite circular outwardly opening discharge funnels, a frame secured to the rear of the mold board, means on said frame for attaching it to said wheeled frame, and snow expelling mechanism operatively connected with said driving shaft and extending in part laterally through opposite sides of the mold board into the interior of said funnels and having suction fans, one in each of said funnels, adapted to suck the snow in the direction parallel with their axes of rotation, the inner sides of said suction fans being spaced an appreciable distance from said converging mold board walls, the sweep of said mold board walls extending in an unbroken line from its foremost extremity divergingly past the rear peripheral edges of said suction fans to the outside thereof whereby to enable the snow to be sucked in from the inside of said suction fans and be expelled laterally therethrough.

4. The combination with a motor-propelled vehicle frame having a forwardly extended motor driven shaft, of a snow plow comprising rearwardly diverging mold boards having substantially semi-cylindrical open outer ends and a rotary discharge means at the outer open end of each mold board, a single shaft for driving said discharge means, and a universal joint connecting said last mentioned shaft and said motor driven shaft.

5. A snow plow adapted to be mounted on a vehicle frame comprising mold boards extending laterally and rearwardly at substantially equal angles to the center line of said frame, meeting in a line and forming a point, said mold boards having a continuous surface curved to form respectively reversely directed substantially circular discharge funnels opening laterally, and rotary discharge means mounted to rotate on a transverse axis in and adjacent the outer end of each of said funnels.

6. The structure set forth in claim 5, said discharge means comprising fans each mounted on a shaft extending transversely of said frame and disposed substantially concentric with the outer ends of said funnels.

7. A snow plow adapted to be mounted on a vehicle frame comprising mold boards having substantially continuous surfaces extending reversely rearwardly and laterally from the front meeting line; said mold boards having their front surfaces concavely curved to form reversely directed substantially circular discharge funnels, and a rotary discharge member mounted in and adjacent the outer end of each funnel.

8. The structure set forth in claim 7, said rotary discharge members comprising a fan disposed substantially concentric with said funnel and having blades inclined to the axis thereof to discharge outwardly and conforming substantially to the surface of said funnel.

9. A snow plow comprising mold boards extending rearwardly and laterally in reverse directions substantially in a straight line and forming continuous front concave surfaces meeting in a central line and forming a forwardly extending point at their lower edges, the concavity of said mold boards increasing toward heir rear ends to form substantially circular discharge funnels.

10. In combination with a vehicle frame carrying a motor and having a motor driven shaft projecting at its forward end, of a snow plow comprising a pair of reversely extended mold boards meeting in a line and concavely curved to form substantially circular discharge funnels at their outer ends, a rotary discharge means disposed respectively adjacent the end of each of said funnels, a single shaft extending rearwardly from said mold boards for driving said discharge means, and a universal joint connecting said last mentioned shaft and said motor driven shaft.

11. In combination with a motor-propelled vehicle frame having a forwardly extending motor driven shaft, of a snow plow comprising rigidly connected mold boards extending reversely laterally and rearwardly from a front central line, spaced supports connected, respectively, to the rear of said mold boards and pivotally connected to said frame, a rotary discharge means adjacent the outer end of each mold board, a shaft connected to said discharge means for driving the same extending rearwardly from said mold boards, a universal joint connecting said shaft and said motor driven shaft, the pivotal points of said supports being substantially transversely alined with said universal joint, and means for holding said supports and mold boards in various positions of adjustment about said pivotal points of said supports.

12. In combination with a motor-propelled vehicle frame having spaced side frame members carrying a motor and having a forwardly extending motor driven shaft, of a snow plow comprising reversely laterally and rearwardly extending concavely curved mold boards, a rotary discharge means for each mold board mounted on the transverse axis, spaced bars secured, respectively, to the rear of each mold board, pivots connecting said bars respectively to the side members of said frame, a shaft extending rearwardly from said mold boards connected to said rotary discharge means for driving the same, a universal joint connecting said last mentioned shaft and said motor driven shaft, said pivots being substantially transversely alined with said universal joint, and clamping means connecting said bars and side frame members for holding said bars and mold boards in various adjusted positions about said pivots.

13. A snow plow having in combination, a mold board having rearwardly and outwardly inclined portions diverging from a central line, each portion forming a continuous concave surface, the concavity of said surface increasing toward the outer end of said portion, which ends are substantially semi-cylindrical in form, said surface having substantially rectilinear elements in horizontal central cross section.

14. A snow plow having in combination, a mold board comprising rearwardly and outwardly inclined portions forming continuous concave surfaces substantially semi-cylindrical at their outer open ends, and rotary fans disposed in and axially alined with said outer ends, and formed to discharge the snow outwardly substantially longitudinally of said surfaces.

15. The structure set forth in claim 14, said fans being axially alined, and a shaft extending rearwardly from said mold board and driving both of said fans.

16. The structure set forth in claim 14, said fans being axially alined and having axial driving means secured thereto mounted in bearings carried by said mold board and extending therethrough to the rear thereof, and a single rearwardly extending shaft geared to said means for driving the same.

17. A snow plow adapted to be mounted on a vehicle frame comprising mold boards having substantially continuous surfaces extending reversely rearwardly and laterally from the front meeting line, which line is disposed in substantial alinement with the center line of said vehicle frame, said mold boards having their front surfaces concavely curved to form reversely disposed substantially circular discharge funnels, and a rotary fan mounted in and adjacent the end of each funnel on a shaft extending substantially at right angles to the longitudinal center line of said vehicle frame and substantially concentric with the outer end of each funnel.

18. A snow plow adapted to be mounted on a vehicle frame comprising mold boards having substantially continuous surfaces extending reversely rearwardly and laterally from a front meeting line, said mold boards having their front surfaces concavely curved to form reversely directed substantially circular discharge funnels, the outer ends of said funnels being disposed in planes substantially parallel with the longitudinal center line of said vehicle frame.

19. The structure set forth in claim 13, rotary discharge members disposed at each side of said mold board, a shaft extending rearward from said mold board, means connecting said shaft and said rotary discharge member, a second shaft connected to said shaft by a universal joint and forming the motor shaft of a vehicle adapted to propel said plow.

20. A snow plow having in combination, a mold board having rearwardly and outwardly inclined portions diverging from a central line, said portions forming continuous surfaces of concave form, the concavity increasing toward the outer end of said mold board, a rotary discharge means adjacent each end of said mold board, a vehicle for propelling said plow having a motor shaft extending forwardly therefrom, and a single shaft extending rearwardly from said mold board and connected to said motor shaft by a universal joint, and connected to said rotary discharge means for driving the same.

21. The structure set forth in claim 20, connecting means secured to said plow and pivoted to said vehicle on an axis alined with said universal joint.

22. The combination with an automobile and the frame, motor and motor shaft thereof, of a snow plow disposed in front of said automobile, comprising a concave mold board, means connected to said plow and said automobile frame and movable about a horizontal axis on the latter, snow propelling means on said plow, a shaft extending rearwardly from said plow connected to said propelling means for driving the same, and a universal joint connecting said shaft and said motor shaft of said automobile and alined with said horizontal axis.

23. The combination with an automobile and the frame, motor and motor shaft thereof, of a snow plow disposed in front of said automobile comprising rearwardly inclined mold board, spaced members connected to said plow and pivotally connected to said frame about a horizontal axis, rotary snow propelling means on said plow, a shaft extending rearwardly centrally of said plow connected to said propelling means for driving the same, and a universal joint connecting said shaft to said motor shaft and alined with said horizontal axis.

24. The combination with an automobile, the frame and motor thereof, of a snow plow disposed in front of said automobile comprising a mold board having reversely and rearwardly extending sides, a rotary discharge means adjacent the outer end of each side, a shaft extending rearwardly from said plow operatively connected to said rotary discharge means for driving the same, and connected to said motor of said automobile, and means adapted to be manipulated by the driver of said automobile for connecting and disconnecting said rotary discharge means from said shaft.

25. The combination with an automobile and the frame, motor and motor shaft thereof, of a snow plow disposed in front of said automobile, means connected to said plow and said automobile frame and movable about a horizontal axis on the latter, snow propelling means on said plow comprising a pair of rotating members, a shaft extending rearwardly from said plow connected to said members for driving the same, and a universal joint connecting said shaft and said motor shaft of said automobile and alined with said horizontal axis.

In testimony whereof I affix my signature.

JOHN O. JOHNSON.